United States Patent [19]

Schultz et al.

[11] 3,896,895
[45] July 29, 1975

[54] AXLE ARRANGEMENT FOR VEHICLES

[75] Inventors: Otto Wilhelm Oswald Schultz; Hilmar Feutlinske; Kurt Gentzsch, all of Hamburg, Germany

[73] Assignee: Hamburger Hochbahn Aktiengesellschaft, Hamburg, Germany

[22] Filed: Nov. 15, 1973

[21] Appl. No.: 416,084

[30] Foreign Application Priority Data
Nov. 16, 1972  Germany............................ 2256121

[52] U.S. Cl..................................... 180/75; 180/88
[51] Int. Cl........................................... B60b 35/16
[58] Field of Search............ 180/75, 73 R, 70 R, 88

[56] References Cited
UNITED STATES PATENTS

| | | | |
|---|---|---|---|
| 1,371,904 | 3/1921 | Klein................................. | 180/88 X |
| 2,463,310 | 3/1949 | Probst............................... | 180/73 R |
| 3,041,890 | 7/1962 | O'Brien............................. | 180/75 X |
| 3,116,804 | 1/1964 | Boehner et al. ..................... | 180/75 |
| 3,193,042 | 7/1965 | Brewer............................... | 180/73 R |
| 3,420,327 | 1/1969 | Nallinger et al. ..................... | 180/75 |

*Primary Examiner*—David Schonberg
*Assistant Examiner*—John P. Silverstrim

[57] ABSTRACT

An axle arrangement for a vehicle and particularly for buses having the engine in the rear in which the central portion of the rear axle including the differential is offset downwardly from the normal axis of the rear axle and if desired forwardly also and in which the brake mechanisms are disposed adjacent the differential rather than at the wheels so that the level of the floor of the vehicle may be lowered a significant amount.

2 Claims, 4 Drawing Figures

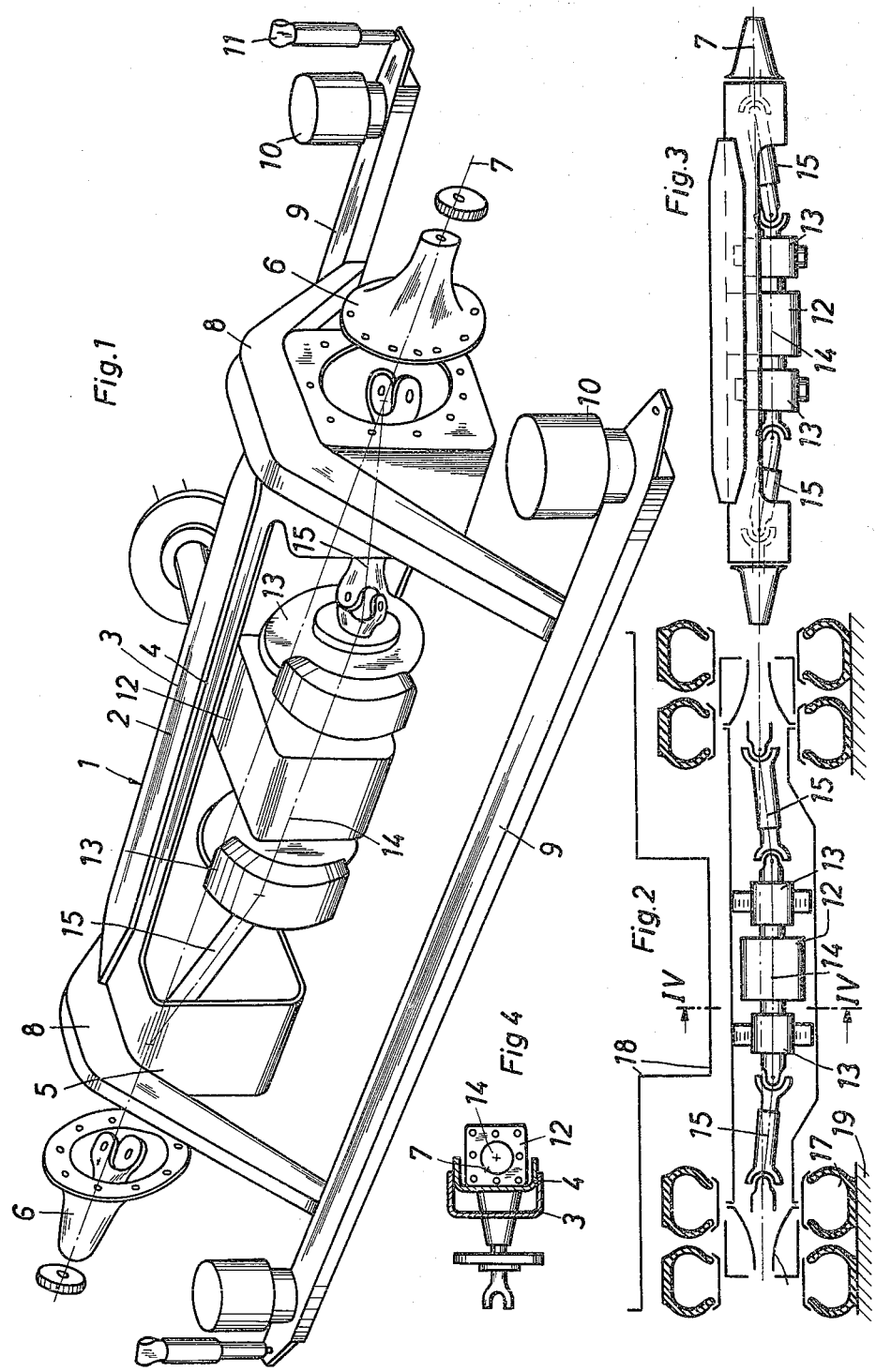

AXLE ARRANGEMENT FOR VEHICLES

An axle arrangement for vehicles permitting decreased floor levels.

The floor level of buses and similar vehicles essentially is determined by the position of the driven axle. Rigid axles in which the support bracket is formed by the housing for the drive shafts and the differential gear are conventional, all of these parts being mounted coaxially with the wheel axles. The spring support for rigid axles requires a certain minimum spacing between the differential housing and the vehicle floor, and also the wheel diameter cannot be arbitrarily reduced because the wheel hubs contain the brake mechanisms, whereby such rigid axle arrangements will not permit lowering the floor level of the vehicle below a certain minimum.

Rigid axle arrangements furthermore are known, in which the drive shafts are not located within the support bracket for the rigid axle; for instance, the drive shafts may be eccentrically located with respect to the wheel bearing when the latter includes a reduction gearing. However the arrangement of a reduction gear in a wheel bearing admitting the drive shafts eccentrically requires a large wheel diameter which precludes a low floor level. The initially mentioned concentric location of the drive shafts entering the wheel bearing therefore is a compelling requirement for vehicles with low floor levels.

The invention relates to an axle arrangement for a vehicle, especially a passenger bus, so as to permit an especially low floor level. The invention concerns an axle arrangement for a driven pair of wheels provided with brakes, especially for a vehicle such as a bus, in which wheel bearings are rigidly mounted on the ends of a rigid bracket and a differential gear is rigidly mounted centrally of the bracket, and drive shafts are provided from the differential gear to the wheel bearings.

The axle arrangement of the present invention is characterized by a combination of features so that (a) the bracket and the drive shafts, external to latter, are offset from one another in the central region of the vehicle by offsetting the bracket and/or the differential gear with respect to the straight line connecting the wheel axles, in longitudinal direction of the vehicle; (b) the differential gear is offset downwardly with respect to the line connecting the wheel axles; (c) disk brakes are mounted immediately adjacent each side of the differential gear; and (d) universal-joint shafts are mounted in slanted manner between the disk brakes and the wheel bearings.

There are two basic embodiments for characteristic (a), which may however also be combined. In the first embodiment, the bracket will be so offset, with respect to the straight line connecting the wheel axles, in the longitudinal direction of the vehicle that the required space for the brakes next to the differential gear can be obtained in the central area to permit of characteristic (c). When viewed from above, the bracket then will be slightly bent, or U-shaped, with an appropriate spacing from the axle center line at the middle, and mounted at its ends in a conventional manner to the axle bearings. The other embodiment consists in so offsetting the drive shafts, from the axle center line in the longitudinal direction of the vehicle as to obtain the desired spacing with respect to the bracket. In this instance, the universal drive shafts will be mounted obliquely between the brakes near the differential gear and the axle bearings. The downward offset of the differential gear together with the disk brakes enables the floor level in the central area to be lowered. This also requires the oblique mounting of the universal drive shafts. Obviously, the latter also might be mounted in such slanted manner between the differential gear and the axle bearings, that transmission may be performed by miter gears. Design and construction in this instance however would be fairly complex, and universal-joint drive shafts are preferred in the spirit of the invention, so that the direction of differential gear power output will be parallel to the axle bearings.

The above shows that the minor complexity introduced by the axle arrangement of the present invention leads to appreciable advantages over the conventional type when lowering of the floor level.

If the drive shafts are offset with respect to the straight line connecting the wheel axles and away from the bracket, then such offset will be most advantageous if the offset is toward that side away from the engine i.e., forwardly in the case of rear engine vehicles, so as to provide additional space between the engine and the differential gear, which space ordinarily is quite limited in below the floor arrangements of the power train.

The cross-section of the support bracket in the central region of the drive shaft will be properly open and U-shaped, such geometry permitting compact mounting, at least in part, of the brakes and universal drive shafts between the legs of the U-shaped bracket. The bracket will be particularly rigid and light-weight if designed as a box.

The invention will be discussed in greater detail below, in reference to the embodiment illustrated in the drawing in which:

FIG. 1 is a perspective view of the axle arrangement;

FIG. 2 is a vertical sectional view transverse to longitudinal direction of the vehicle;

FIG. 3 is a top plan view; and

FIG. 4 is a cross-section along line IV—IV of FIG. 2.

Axle bracket 1 consists of a center part 2 of U-shaped cross-section, made up of two U-shapes 3 and 4 in the manner of a box, as shown in FIG. 4, and of two end pieces 5 terminating annularly or rectangularly and designed in conventional manner for connection to the axle bearings 6 which for sake of clarity are shown separated from the bracket 2 in FIG. 1. The open side of the bracket faces forwardly in the case of vehicles having engines in the rear. End pieces 5 essentially are coaxial with the connecting line or axis 7 of the wheel axles. On the other hand, center piece 2 is markedly offset with respect to axis 7, as shown in FIGS. 2 and 3.

The end pieces 5 of bracket 1 are connected by means of curved girders 8 with cross-beams 9, said girders extending in the longitudinal direction of the vehicle, said cross-beams being connected by air springs 10 and shock absorbers 11 to the vehicle chassis. The illustrated embodiment of bracket 1, girders 8, cross-beams 9, together with the relatively low air springs 10 allows a low floor level.

A housing 12 of a differential gear is mounted at the center of bracket 1. Disk brakes 13 coaxial with the differential power output are mounted to each side of the housing 12. As shown by FIGS. 2–4, axis 14 of those parts is offset laterally and downwardly with respect to axis 7. Connection is made by universal-joint shafts 15.

Because the brakes 13 have been moved into the central region, wheel hubs 16 and hence wheels 17 may be selected with smaller diameters. A correspondingly reduced floor level above ground 19 is therefore obtained for the floor 18 of the vehicle. A reduction of about 0.2 meters is obtained in the floor levels of buses. The time of entering and leaving the buses, and hence their stopping time at bus stops, will thereby be markedly decreased.

The parts located in the central region of the vehicle, namely the differential gear and the brakes, may be made with correspondingly reduced diameters if reduction gears are installed in the wheel hubs in a conventional manner. However, because of the grounds initially discussed, such reduction gears must be of small diameter and the shafts must be mounted coaxially.

We claim:

1. An axle arrangement for a pair of driven wheels of a vehicle such as a bus comprising a transverse bracket member, said bracket being substantially U-shaped in cross-section and with a generally straight transversely extending side wall and with opposed top and bottom walls extending forwardly of said side wall to define an open portion therein, a pair of opposed end walls intergrally connecting said side wall and said top and bottom walls, opposed coaxial wheel bearings secured to said opposed end walls of said bracket member for supporting said driven wheels, a differential gear secured to the central portion of said bracket, said gear being disposed forwardly in a longitudinal direction from said side wall and having opposed output shafts, braking devices cooperating with said output shafts adjacent said differential gear for braking said driven wheels, said braking device being receivable in the open portion of said bracket, the axis of the output shafts of said differential gear being offset downwardly from and parallel to the axis of said coaxial wheel bearings and externally of said bracket member, universal-jointed drive shafts connecting each of the offset output shafts with each of the driven wheels of the vehicle whereby the floor level of the vehicle may be lowered.

2. An axle arrangement as claimed in claim 1 wherein the axis of the output shafts of said differential gear are also offset forwardly from the axis of said coaxial wheel bearings.

* * * * *